UNITED STATES PATENT OFFICE.

JOSIAH WARREN, OF HARMONY TOWNSHIP, POSEY COUNTY, INDIANA.

IMPROVEMENT IN COMPOSITIONS FOR STEREOTYPE-PLATES.

Specification forming part of Letters Patent No. 4,479, dated April 25, 1846; Reissue No. 246, dated July 26, 1853.

*To all whom it may concern:*

Be it known that I, JOSIAH WARREN, of Harmony township, in the county of Posey and State of Indiana, have invented a new composition of matter as a substitute for type-metal, and a new and improved composition of material on which I make impressions with types, engravings, &c., or on which I form letters or drawings with any suitable instruments, thereby making matrices or molds in which I form casts or types for printing with my substitute for type metal; and I do hereby declare that the following is a full and exact description of the same.

Molds or matrices are made of a tough strong clay mixed with silex in impalpable powder in sufficient quantity to prevent cracking. These materials are made with water into a strong putty, and kneaded very thoroughly until it has acquired all the toughness that can thus be imparted to it. This mixture is now softened with water till it will spread easily and smoothly upon a metallic plate, the thickness of coat varying, according to the work to be done, from the thirtieth to the tenth of an inch. The plates thus coated are allowed to become about half dry, so that a type impressed into them will leave a smooth fac-simile of itself. Into this coating forms are impressed, as hereinafter described, in the stereotyping-plates. These forms may either be an original design or impressed by an original to obtain a copy. When the coating is required to continue moist a longer time than the above, a heavy coating, with additional silex from a twelfth to an eighth of an inch thick, is first spread upon the plate, and immediately afterward the coating first described is spread upon the under coating. It is well to spread with a light brush a little thin gum-arabic paste between the two coatings, but not indispensable.

The above-described matrices are used for music, maps, and similar open-work; but for fine, close, or shaded work, and for writing, the coating should be of a very fine clay without any admixture of silex more than is chemically combined to form the clay. This clay should be of such a nature as will admit of its being spread in the form of a thin mortar to the thickness of one-thirtieth of an inch without showing any cracks in drying. Clay of this quality is found along the banks of the Ohio river, near Evansville, Indiana. When the coating is intended for close Italic handwriting, it may be spread with a tool so constructed as to leave furrows in the surface at such suitable distances as the writer may desire to have his lines. When this becomes hard enough to cut without following the tool, it may be slightly brushed over with a little olive or linseed oil. The writing is done in the furrows with any suitable tool.

To write a copper-plate or running hand, or for close drawings, the following is a good process: Mix a small quantity gum-arabic paste with the mortar made of the pure clay, as above described—enough to change the color of the clay a shade darker when dry. Let this coating get quite dry, and brush it over slightly with oil. With another brush moisten each line or furrow before writing in it. The writing may be done in the ordinary manner, never allowing the tool used to go quite down to the foundation-plate. The cast from this matrix will present a slightly uneven surface, which may be gently ground down with a bone or fine whetstone.

The following process may be used as a substitute for the method above described: Spread a plate with pure clay—say one-thirtieth of an inch thick, or as thick as will dry without cracking. When dry, heat it sufficiently to melt wax. Then rub over the surface a little beeswax, stearine, or tallow and allow the plate to cool. When cold, spread on another coating of pure clay in which a little olive or linseed oil is thoroughly mixed. This should be worked on as soon as it is sufficiently dry to allow the tool to work freely.

A great variety of clouded, wavy, or smoky effects, either as parts of a picture or as tinted grounds, are instantly produced in a matrix by wetting the surface to a creamy softness and applying a brush or toothed tool with such motion as may be adapted to the design. This may be termed the "hylographic" process.

*Type composition, or silicate of lac.*—Take one pound of good shellac, say four ounces of good clean tar, melt together over a gentle fire, and then stir into this mixture two pounds of fine silicious sand. When thoroughly mixed, turn out and flatten into thin sheets—say an eighth of an inch thick. When cold, it may be broken up for use. Place the matrix over a very gentle heat, in order to expel all dampness, raise the heat a little short of the hissing or boiling point, then lay over the matrix pieces of the silicate sufficient to cast a plate an eighth of an inch thick. Lay upon this a wooden block of the length and breadth required and about three-fourths of an inch thick. When the silicate is sufficiently softened to take the impression, take the whole to the press. Strips of wood or other material should be placed upon each end of the matrix-plate, as guides or bearers, so that the cast shall be exactly type-height. This being done, bring the press gently down upon it until the bearers stop it. When cold, remove the cast from the matrix-plate, and with a brush carefully wash the face of the cast without wetting the back of the block. The face of the cast or type may be polished with a hone or other suitable substance. It is now ready to take a proof, and if perfect, is ready for the press. If not perfect, mark the imperfections on the proof-sheet, to be corrected by the following process of stereotyping: Take a metallic plate previously spread with the coarse under coating—say four of fine sand to one of clay—covered with a coating somewhat finer, as first described. When this is so dry as to leave a clean impression from a type it is ready for use. Next secure the imperfect cast of type firmly in a square frame, or printer's chase, with guides or bearers, as before mentioned, to prevent too deep an impression. The plate with the clay coatings is now turned down upon the cast and placed under the press. The pressure is gently withdrawn and the imprinted matrix lifted carefully from the cast or type. (The bearers should have springs so constructed as to lift the matrix from the type on the withdrawal of the pressure.) This gives a new matrix, in which all the necessary corrections are made and a new cast taken as before.

Stereotyping may be performed by the use of any of the matrices above described, using them when the moisture is sufficiently evaporated to leave a clean impression from a type, as before mentioned. Fine engraving, or anything of that nature, may be more beautifully stereotyped by the use of a matrix of pure soft clay mortar spread thinly upon a flat surface of dry clay. Press the engraving into it, and allow it to remain until the whole is sufficiently dried to lift the original from the matrix.

Casts or types for printing fac-similes of leaves, or other substances the different parts of whose surface do not vary in height more than the twelfth of an inch, may be readily made by using those substances themselves to im press their form, either in the clay matrix or in a flat surface of the selicate previously prepared to be used as a type.

The blanks between paragraphs of written or printed matter, whether in the original or in the stereotype matrices, should be filled up with a mixture of about six parts of fine sand to one of clay, which should be applied about the thickness of cream. The margins may be filled with the same mixture in the form of mortar, and may be applied with a knife or spatula.

What I claim as my invention, and desire to secure by Letters Patent, is—

1. The mixture herein described of shellac, tar, and sand, as a substitute for type-metal.

2. The use of shellac as a basis to form a substitute for type-metal, whether it be mixed with the substances I have mentioned or with other substances of a similar nature.

3. The use of clay, clay mixed with sand in various proportions, also with gum-arabic, beeswax, stearine, tallow, and oil, as before described, for the purpose of engraving or forming matrices or molds in which to make casts for typographical purposes of the material and in the manner substantially as herein set forth.

4. The use of clay as a basis from which to form matrices or molds, as aforesaid, whether it be mixed with the material I have mentioned or whether other substances be used instead of them, but substantially of the same nature.

5. In combination with the employment of the plastic material for stereotyping, the employment of the bearers, in the manner described, for the purpose of obtaining casts exactly level and of type-height.

In witness whereof I hereunto set my hand this 8th day of March, 1883.

JOSIAH WARREN.

Witnesses:

THOS. E. WARREN,
J. J. GREENOUGH.